United States Patent
Yu et al.

(10) Patent No.: US 10,796,699 B2
(45) Date of Patent: Oct. 6, 2020

(54) METHOD, APPARATUS, AND COMPUTING DEVICE FOR REVISION OF SPEECH RECOGNITION RESULTS

(71) Applicant: GUANGZHOU SHENMA MOBILE INFORMATION TECHNOLOGY CO., LTD., Guangzhou, Guangdong (CN)

(72) Inventors: Zhichao Yu, Guangzhou (CN); Zhihui Zheng, Guangzhou (CN)

(73) Assignee: Guangzhou Shenma Mobile Information Technology Co., Ltd., Guangzhou (CN)

( * ) Notice: Subject to any disclaimer, the term of this patent is extended or adjusted under 35 U.S.C. 154(b) by 62 days.

(21) Appl. No.: 15/835,248

(22) Filed: Dec. 7, 2017

(65) Prior Publication Data

US 2018/0166080 A1    Jun. 14, 2018

(30) Foreign Application Priority Data

Dec. 8, 2016   (CN) .......................... 2016 1 1122247

(51) Int. Cl.
  *G10L 15/26*   (2006.01)
  *G10L 15/22*   (2006.01)
  *G06F 40/166*  (2020.01)

(52) U.S. Cl.
  CPC .......... *G10L 15/265* (2013.01); *G06F 40/166* (2020.01); *G10L 15/22* (2013.01); *G10L 15/26* (2013.01); *G10L 2015/221* (2013.01)

(58) Field of Classification Search
  CPC ......... G10L 15/00; G10L 15/22; G10L 15/26; G10L 15/265; G06F 17/24
  See application file for complete search history.

(56) References Cited

U.S. PATENT DOCUMENTS 5,463,696 A   10/1995   Beernink et al.
5,937,380 A    8/1999   Segan
(Continued)

FOREIGN PATENT DOCUMENTS

CN    1387639 A    12/2002
CN  101068271 A    11/2007
(Continued)

OTHER PUBLICATIONS

First Search dated Feb. 27, 2019, issued in related Chinese Application No. 201611122247.6 (2 pages).
(Continued)

*Primary Examiner* — Paras D Shah
(74) *Attorney, Agent, or Firm* — Sheppard Mullin Richter & Hampton LLP

(57) ABSTRACT

The present disclosure discloses an information input method and device, and a computing apparatus. The information input method comprises receiving a voice input of a user, acquiring a recognition result on the received voice input, and enabling editing of the acquired recognition result in a text format. With the information input mechanism, according to the present invention, a user is able to choose to revise an automatic speech recognition result in a text editing format, particularly in the case where a small amount of errors occurs to the contents of speech recognition. As a result, the trouble that all contents of a voice input need to be input again is avoided, the speech recognition efficiency is increased, and the user experience is improved.

16 Claims, 2 Drawing Sheets

(56) References Cited

U.S. PATENT DOCUMENTS

| | | |
|---|---|---|
| 6,353,809 B2 | 3/2002 | Takahashi et al. |
| 6,584,180 B2 | 6/2003 | Nemoto |
| 7,137,076 B2 | 11/2006 | Iwema et al. |
| 7,403,888 B1 | 7/2008 | Wang et al. |
| 7,577,569 B2 | 8/2009 | Roth et al. |
| 7,873,523 B2 | 1/2011 | Potter et al. |
| 8,286,071 B1* | 10/2012 | Zimmerman ......... G06F 17/248 715/205 |
| 8,407,039 B2 | 3/2013 | Kim et al. |
| 8,719,014 B2 | 5/2014 | Wagner |
| 8,886,540 B2 | 11/2014 | Cerra et al. |
| 8,904,306 B1* | 12/2014 | Whitney ............. G06F 3/04883 345/156 |
| 8,996,379 B2 | 3/2015 | Cerra et al. |
| 9,002,714 B2 | 4/2015 | Kim et al. |
| 9,117,449 B2 | 8/2015 | Newman et al. |
| 9,542,944 B2 | 1/2017 | Jablokov et al. |
| 10,176,806 B2 | 1/2019 | Engelhardt |
| 2007/0288862 A1* | 12/2007 | Ording .................. G06F 3/0481 715/788 |
| 2008/0154600 A1* | 6/2008 | Tian ...................... G10L 15/083 704/251 |
| 2009/0240488 A1* | 9/2009 | White ................... G06F 3/0236 704/9 |
| 2009/0276215 A1* | 11/2009 | Hager ................... G06F 17/273 704/235 |
| 2010/0153112 A1 | 6/2010 | Phillips et al. |
| 2011/0055256 A1* | 3/2011 | Phillips ................. G10L 15/30 707/769 |
| 2012/0020577 A1* | 1/2012 | Yasrebi ................. G10L 15/26 382/229 |
| 2012/0259633 A1* | 10/2012 | Aihara .................. H04M 1/271 704/235 |
| 2013/0179173 A1 | 7/2013 | Lee et al. |
| 2014/0143533 A1* | 5/2014 | Ganong, III ........ H04L 63/0861 713/150 |
| 2015/0019221 A1* | 1/2015 | Lee ......................... G10L 15/08 704/246 |
| 2015/0089419 A1* | 3/2015 | Hwang .................. G06F 3/017 715/768 |

FOREIGN PATENT DOCUMENTS

| | | |
|---|---|---|
| CN | 102246587 A | 11/2011 |
| CN | 103106061 A | 5/2013 |
| CN | 104462262 A | 3/2015 |
| CN | 105159870 A | 12/2015 |
| CN | 106537492 A | 3/2017 |

OTHER PUBLICATIONS

First Office Action dated Mar. 7, 2019, issued in related Chinese Application No. 2016111222476 (13 pages), with English machine translation.

Second Office Action dated Aug. 8, 2019, issued in related Chinese Application No. 201611122247.6, with English machine translation (12 pages).

Third Office Action dated Dec. 23, 2019, issued in related Chinese Application No. 201611122247.8, with English machine translation (14 pages).

Fourth Office Action dated Apr. 13, 2020, issued in related Chinese Application No. 201611122247.6, with English machine translation (15 pages).

* cited by examiner

METHOD, APPARATUS, AND COMPUTING DEVICE FOR REVISION OF SPEECH RECOGNITION RESULTS

CROSS REFERENCE TO RELATED APPLICATION

This application claims the priority to Chinese Patent Application No. 201611122247.6 filed with the State Intellectual Property Office of the People's Republic of China on Dec. 8, 2016, the content of which is incorporated herein by reference in its entirety.

TECHNICAL FIELD

The present disclosure generally relates to the field of voice input and recognition technologies, and in particular, to an information input method and device, and a computing apparatus that allows manual revision of speech recognition results.

BACKGROUND

Speech recognition is an application technology commonly adopted on clients right now. For example, speech recognition has been extensively applied in the field of intelligent speech search and various social communication applications.

For example, a user inputs a content to be searched via voice at a client, the client sends the received voice input to a server that is typically remote, and the server performs recognition on the voice input and then returns a speech recognition result and a corresponding search result to the client. As another example, when a user is using social communication software that allows voice input, he/she may choose to convert a voice session to a text display so as to make it more convenient for the user to input information.

When a recognition error occurs to a single letter or word in a result of speech recognition on multiple sentences, however, the prior art usually requires a user to input all the contents via voice again, which leads to a very low voice input efficiency and poor user experience, particularly in the case where only a small number of letters or words has errors. As the speech recognition technology is not significantly improved, moreover, it is very likely that a desired recognition result cannot be obtained even after multiple times of voice inputs by the user.

Therefore, there is a need for an information input mechanism that can solve the problem above, thereby increasing the speech recognition efficiency and improving the user experience.

SUMMARY

One object of the present invention is to correct recognition errors in a simple and convenient manner when errors take place to speech recognition.

To achieve the above object, in one embodiment, the present invention provides an information input mechanism that allows manual correction of speech recognition results, such that a user can choose to revise recognition results in a text editing format when finding errors to automatic speech recognition, thereby increasing the speech recognition efficiency and improving the user experience.

According to one aspect of the present invention, an information input method, in particular an information input method for speech retrieval, is provided, which comprises the following steps: receiving a voice input of a user; acquiring a recognition result on the received voice input; and enabling editing of the acquired recognition result in a text format.

By using this method, a user can choose to revise automatic speech recognition results in a text editing format. As a result, the trouble that all contents of a voice input need to be input again is avoided, the speech recognition efficiency is increased, and the user experience is improved. The present invention is particularly applicable to cases where speech recognition contents have a small amount of errors.

In one embodiment of the present invention, the step of acquiring a recognition result on the received voice input comprises: sending the received voice input to a server; and receiving a recognition result on the voice input according to a speech recognition model and returned by the server.

In one embodiment of the present invention, the information input method further comprises: feeding the recognition result edited in the text format back to the server for training the speech recognition model. By using the present embodiment, the accuracy of speech recognition results output by the server and for a particular user can be gradually improved.

In one embodiment of the present invention, the step of enabling editing of the acquired recognition result in a text format comprises: entering, in response to a particular operation by the user on the acquired recognition result, a text editing mode to revise the recognition result.

In one embodiment of the present invention, the step of enabling editing of the acquired recognition result in a text format comprises: presenting, in an associated manner, an editing mode logo for the recognition result; and entering, in response to a trigger of the editing mode logo by the user, a text editing mode to revise the recognition result.

In one embodiment of the present invention, the trigger comprises a combination of any one or more of the following: a single click, a double click and a hovering on the editing mode logo.

In one embodiment of the present invention, the step of acquiring a recognition result on the received voice input comprises: acquiring a list of recognition results on the voice input, the list of recognition results comprising a plurality of recognition results; and determining a recognition result selected by the user from the list of recognition results as the acquired recognition result. Moreover, the step of enabling editing of the acquired recognition result in a text format comprises: enabling the user to edit any recognition result in the list of recognition results in a text format when the user does not select any recognition result in the list of recognition results.

According to another aspect of the present invention, an information input device is provided, which comprises: a voice input receiving unit configured to receive a voice input of a user; a recognition result acquiring unit configured to acquire a recognition result on the received voice input; and a text editing unit configured to enable editing of the acquired recognition result in a text format.

In one embodiment of the present invention, the recognition result acquiring unit comprises: an input sending module configured to send the received voice input to a server; and an input returning module configured to receive a recognition result on the voice input according to a speech recognition model and returned by the server.

In one embodiment of the present invention, the information input device further comprises: a revision feedback unit configured to feed the recognition result edited in the text format back to the server for training the speech recognition model.

In one embodiment of the present invention, the text editing unit comprises: a text revising module configured to enter, in response to a particular operation by the user on the acquired recognition result, a text editing mode to revise the recognition result.

In one embodiment of the present invention, the text revising module comprises: a logo presenting sub-module configured to present, in an associated manner, an editing mode logo for the recognition result; and a logo trigger sub-module configured to enter, in response to a trigger of the editing mode logo by the user, a text editing mode to revise the recognition result.

In one embodiment of the present invention, the trigger comprises a combination of any one or more of the following: a single click, a double click and a hovering on the editing mode logo.

In one embodiment of the present invention, the recognition result acquiring unit comprises: a list acquiring module configured to acquire a list of recognition results on the voice input, the list of recognition results comprising a plurality of recognition results; and a recognition result determining module configured to determine a recognition result selected by the user from the list of recognition results as the acquired recognition result. Moreover, the text editing unit is further configured to enable the user to edit any recognition result in the list of recognition results in a text format when the user does not select any recognition result in the list of recognition results.

According to yet another aspect of the present invention, a computing apparatus is provided, which comprises: a network interface, the network interface enabling the computing apparatus to conduct data communications with a server via one or more networks; a memory configured to store data communicated via the network interface; and one or more processors in connection with the network interface and the memory, the one or more processors being configured to execute the following operations: receiving a voice input of a user; acquiring a recognition result on the received voice input; and enabling editing of the acquired recognition result in a text format.

With the information input mechanism, according to the present invention, a user is able to choose to revise an automatic speech recognition result in a text editing format, particularly in the case where a small amount of errors occurs to the contents of speech recognition. As a result, the trouble that all contents of a voice input need to be input again is avoided, the speech recognition efficiency is increased, and the user experience is improved.

BRIEF DESCRIPTION OF THE DRAWINGS

The above and other objects, features and advantages of the present disclosure will become clearer through a further detailed description of illustrative embodiments of the present disclosure with reference to the accompanying drawings, wherein identical reference numerals in the illustrative embodiments of the present disclosure usually represent identical parts.

DETAILED DESCRIPTION

Preferred implementation manners of the present disclosure will be described in more detail with reference to the accompanying drawings. Although the preferred implementation manners of the present disclosure are displayed in the accompanying drawings, it should be understood that the present disclosure may be implemented in various manners, but will not be limited by the implementation manners described herein. On the contrary, these implementation manners are provided to make the present disclosure more thorough and complete, and moreover, they can fully convey the scope of the present disclosure to those skilled in the art.

As described above, to correct recognition errors in a simple and convenient manner when errors take place to speech recognition, the information input mechanism according to the present invention enables a user to manually revise recognition results in a text editing format when finding errors to automatic speech recognition, making it unnecessary to re-input a large segment of voice.

Figure 1:
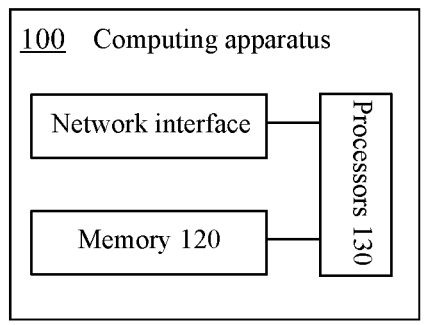
FIG. 1 is a structural block diagram of a computing apparatus in an embodiment of the present invention.

Embodiments of the present invention will be specifically described below with reference to FIG. 1 to FIG. 3. FIG. 1 is a structural block diagram of a computing apparatus 100 in an embodiment of the present invention. Parts of the computing apparatus 100 include, but are not limited to a network interface 110, a memory 120, and one or more processors 130. The processors 130 are in connection with the network interface 110 and the memory 120. In one embodiment of the present invention, the above parts and other parts of the computing apparatus 100 not shown in FIG. 1 may also be connected with each other, e.g. via a bus. It should be understood that the structural block diagram of the computing apparatus shown in FIG. 1 is only for a purpose of illustration, rather than a limitation to the scope of the present invention. Those skilled in the art may add or replace with other parts as needed, such as an audio input device (e.g. a microphone).

The computing apparatus 100 may be any type of immobile or mobile computing apparatuses, including a mobile computer or a mobile computing apparatus (e.g. a tablet computer, a personal digital assistant, a laptop computer, a notebook computer, a netbook, etc.), a mobile phone (e.g. a smart phone), a wearable computing apparatus (e.g. a smart watch, smart glasses, etc.), or other types of mobile devices, or immobile computing apparatuses, such as a desktop computer or PC.

The network interface 110 enables the computing apparatus 100 to conduct data communications with a server via one or more networks. Examples of these networks include a local area network (LAN), a wide area network (WAN), a personal area network (PAN), or a combination of communication networks like the Internet. The network interface 110 may include one or more of any type of wired or wireless network interfaces (e.g. a network interface card (NIC)), such as IEEE 802.11 wireless local area network (WLAN) wireless interfaces, Worldwide Interoperability for Microwave Access (WiMAX) interfaces, ethernet interfaces, universal serial bus (USB) interfaces, cellular network interfaces, Bluetooth interfaces, near field communication (NFC) interfaces, etc.

Data communicated via the network interface 110, such as the recognition result received from the server via the network interface 110 or the voice input recognition result edited in the text format in the present invention, is stored at a designated location in the memory 120. The memory 120 may comprise one or more of any type of storage devices capable of storing contents in a file format or other formats, including a magnetic hard drive, a solid state hard drive, a semiconductor storage device, a flash drive, or any other computer readable/writable storage medium capable of storing program instructions or digital information.

Figure 2:
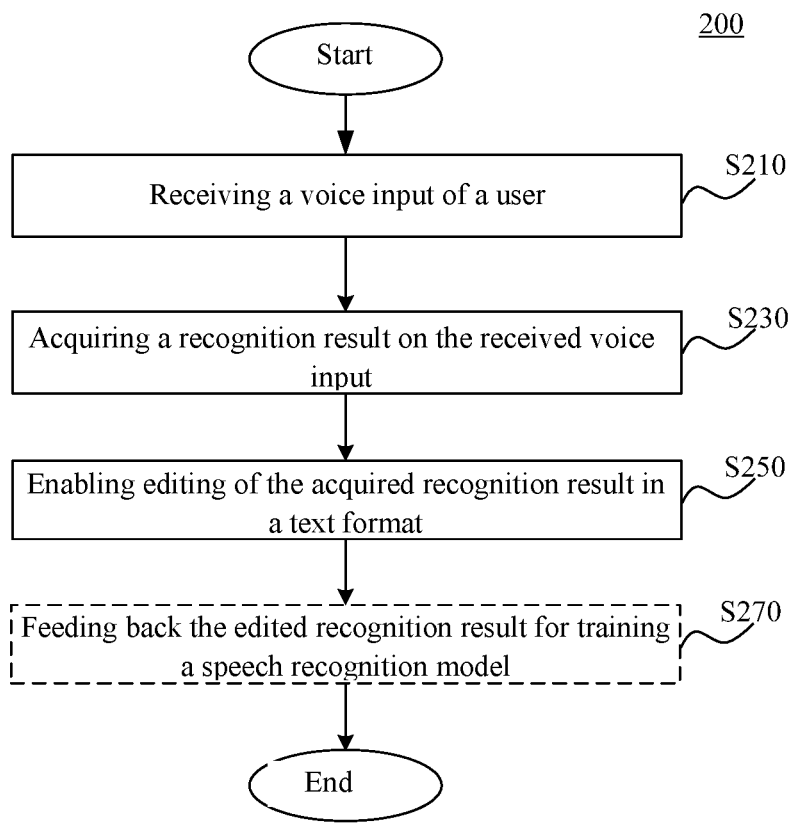
FIG. 2 is a general flow chart of an information input method in an embodiment of the present invention.

FIG. 2 shows processing by the information input mechanism according to the present invention that is enabled by the processors 130. FIG. 2 is a general flow chart of an information input method 200 in an embodiment of the present invention. It should be noted that the information input in the present invention particularly refers to message input, e.g. online search and retrieval of items, social network sessions, etc. The above description is certainly not a limitation to the present invention, and the information input mechanism according to the present invention may be applied to any information type applicable for voice input.

The method 200 begins in the step S210, as shown in FIG. 2, where the processors 130, for example, receive a voice input of a user via an audio input device (not shown), such as a microphone, of the computing apparatus 100.

Subsequently in the step S230, the processors 130 acquire a recognition result on the received voice input. Specifically, in one embodiment of the present invention, the processors 130 send the received voice input to a server via the network interface 110. The server, for example, performs recognition on the voice input according to a speech recognition model, and then returns the recognition result to the computing apparatus 100.

The processors 130 display the received recognition result to a user via a display device (e.g. a display, a touchscreen, etc., which is not shown) of the computing apparatus 100, for example, using TextView, a function in the Android system, to display the recognition result in a text format.

In a further embodiment, when the computing apparatus 100 is waiting for the server to return a recognition result, an animation indicating the ongoing speech recognition (e.g. a microphone logo at a particular position on the screen) may be displayed on the display device. The animation may be implemented by using a self-plotting View that continuously refreshes the View at a time interval of T1 through a timer to plot three straight lines. When the speech recognition is completed and the server returns a recognition result, the function TextView is called to display the final recognition result, and the animation indicating the ongoing speech recognition is hidden.

When the user finds that the displayed recognition result has errors, the user is enabled to edit the acquired recognition result in a text format in the step S250.

In one embodiment of the present invention, there may be a plurality of recognition results returned from the server, namely the processors 130 may acquire a list of recognition results. A user can select a recognition result from the list of recognition results as the final correct recognition result.

In the case where the user determines that all recognition results in the list of recognition results are incorrect, the processors 130 enters the step S250, such that the user can edit any recognition result in the list of recognition results in a text format.

In one embodiment of the present invention, in response to a particular operation by the user on the acquired recognition result, a text editing mode is entered to revise the recognition result. For example, an editing mode logo is presented in an associated manner for the recognition result on a display device (e.g. at a position alongside or adjacent to the text display content of the recognition result). In one example, the function ImageView may be called to implement an animation of the editing mode logo.

Subsequently, in response to a trigger of the above editing mode logo by the user, a text editing mode is entered to revise the recognition result. In one embodiment of the present invention, the trigger comprises a combination of any one or more of the following: a single click, a double click and a hovering on the editing mode logo. It should be noted that the above example of trigger is not intended to limit the scope of the present invention, and any posture or interaction action with a display device that can enable a user to activate the editing mode logo to revise a speech recognition result can be applied in the present invention.

In a specific implementation, after a user clicks an editing mode of the function ImageView to recognize an animation, EditView is triggered and created, thereby entering a text editing mode. The EditView, for example, may use a Translation animation that slides out from the bottom of the screen of a display device. The animation execution duration is T2, and an interpolator uses acceleration first and subsequently deceleration. Moreover, the system input method can be called, and the user can revise or re-input a content to be searched.

In an application scenario of speech search, a new search is initiated by using the result after a text revision by a user. Here, an existing method may be called to initiate the search, and a new WebView is created to present new search results returned by a server.

By using this method, a user can choose to revise automatic speech recognition results in a text editing format. As a result, the trouble that all contents of a voice input need to be input again is avoided, the speech recognition efficiency is increased, and the user experience is improved. The present invention is particularly applicable to cases where speech recognition contents have a small amount of errors.

In one embodiment of the present invention, the information input method 200 provided in FIG. 2 further comprises a step S270, wherein the recognition result edited in the text format is fed back to the server for training the speech recognition model. By using the present embodiment, the accuracy of speech recognition results output by the server and for a particular user can be gradually improved.

Figure 3:
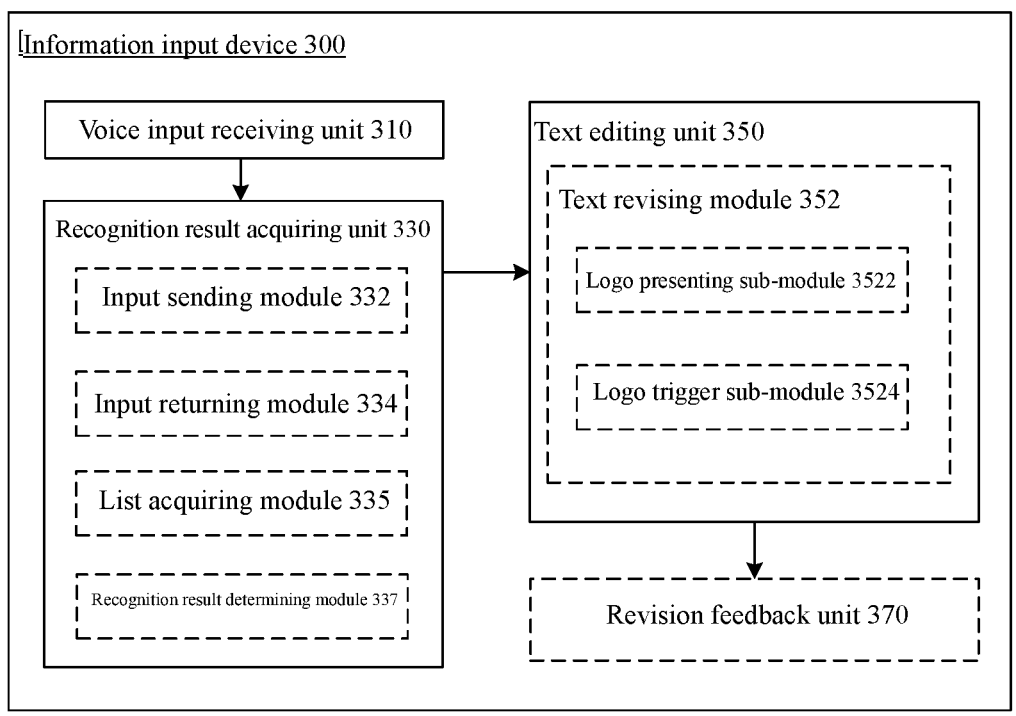
FIG. 3 is a functional block diagram of an information input device in an embodiment of the present invention.

FIG. 3 is a functional block diagram of an information input device 300 in an embodiment of the present invention. The functional modules of the information input device 300 may be implemented by hardware, software or a combination of hardware and software that implements the principle of the present invention, e.g. implemented by the one or more processors 130 in the computing apparatus 100 shown in FIG. 1. Those skilled in the art should understand that the functional modules described in FIG. 3 may be combined or divided into sub-modules, thereby implementing the principle of the present invention. Therefore, the description herein can support any possible combination, division, or further definition of the functional modules described herein.

Referring to FIG. 3, to improve the speech recognition efficiency, the information input device 300 according to the present invention comprises a voice input receiving unit 310, a recognition result acquiring unit 330, and a text editing unit 350.

The voice input receiving unit 310 is configured to receive a voice input of a user.

The recognition result acquiring unit 330 is configured to acquire a recognition result on the voice input received by the voice input receiving unit 310.

In one embodiment of the present invention, the recognition result acquiring unit 330 comprises: an input sending module 332 configured to send the received voice input to a server; and an input returning module 334 configured to receive a recognition result on the voice input according to a speech recognition model and returned by the server.

In one embodiment of the present invention, the recognition result acquiring unit 330 may comprise: a list acquiring module 335 configured to acquire a list of recognition results on the voice input, the list of recognition results comprising a plurality of recognition results; and a recognition result determining module 337 configured to determine a recognition result selected by the user from the list of recognition results as the acquired recognition result.

The text editing unit 350 is configured to enable editing of the acquired recognition result in a text format. In the case where the recognition result acquiring unit 330 acquires a list of recognition results, the text editing unit 350 is further configured to enable the user to edit any recognition result in the list of recognition results in a text format when the user does not select any recognition result in the list of recognition results.

In one embodiment of the present invention, the text editing unit 350 comprises a text revising module 352 configured to enter, in response to a particular operation by the user on the acquired recognition result, a text editing mode to revise the recognition result. In a further embodiment of the present invention, the text revising module 352 comprises: a logo presenting sub-module 3522 configured to present, in an associated manner (e.g. at a position alongside or adjacent to the text display content of the recognition result), an editing mode logo for the recognition result; and a logo trigger sub-module 3524 configured to enter, in response to a trigger of the editing mode logo by the user, a text editing mode to revise the recognition result.

In one embodiment of the present invention, the trigger comprises a combination of any one or more of the following: a single click, a double click and a hovering on the editing mode logo. It should be noted that the above example of trigger is not intended to limit the scope of the present invention, and any posture or interaction action with a display device that can enable a user to activate the editing mode logo to revise a speech recognition result can be applied in the present invention.

In one embodiment of the present invention, the information input device 300 may further comprise a revision feedback unit 370 configured to feed the recognition result edited in the text format back to the server for training the speech recognition model. By using the present embodiment, the accuracy of speech recognition results output by the server and for a particular user can be gradually improved.

In summary, with the information input method and device and the computing apparatus according to the present invention, a user is able to choose to revise an automatic speech recognition result in a text editing format, particularly in the case where a small amount of errors occurs to the contents of speech recognition. As a result, the trouble that all contents of a voice input need to be input again is avoided, the speech recognition efficiency is increased, and the user experience is improved.

Moreover, the method according to the present invention may further be implemented as a computer program, and the computer program comprises computer program codes and instructions to execute the above steps defined in the above method according to the present invention. Alternatively, the method according to the present invention may further be implemented as a computer program product, and the computer program product comprises a computer readable medium on which computer programs to execute the above functions defined in the above method according to the present invention are stored. Those skilled in the art should further understand that the various illustrative logic blocks, modules, circuits and algorithm steps described with reference to the disclosure herein may be implemented as electronic hardware, computer software or a combination of the two.

The flow charts and block diagrams in the accompanying drawings have illustrated architectures, functions and operations that may be implemented by the systems and methods according to a plurality of embodiments of the present invention. In this regard, each block in the flow charts or block diagrams may represent a part of a module, a program segment or a code, and the part of the module, program segment or code comprises one or more executable instructions for implementing prescribed logic functions. It should also be noted that, in some alternative implementations, functions marked in the blocks may also take place in an order different from the one marked in the accompanying drawings. For example, two consecutive blocks can actually be executed substantially in parallel, and they may sometimes be executed in a reverse order, which depends on functions that are involved. It should also be noted that each block in the flow charts and/or block diagrams and combinations of the blocks in the flow charts and/or block diagrams may be implemented by a dedicated and hardware-based system for executing prescribed functions or actions, or may be implemented by a combination of dedicated hardware and computer instructions.

The embodiments of the present invention are described above, and the description above is illustrative, rather than exhaustive. Moreover, the description above is not limited to the disclosed embodiments. Without departing from the scope and spirit of the described embodiments, many modification and variations are obvious to those skilled in the art. The terms used herein are selected with an intention to explain, in the best way, the principles and actual applications of the embodiments or improvements to the technologies on the market, or to enable others skilled in the art to understand the embodiments of the present invention.

What is claimed is:

1. An information input method, comprising:
   receiving a voice input of a user;
   sending the received voice input to a server;
   displaying an animation having a continuous refresh rate while the server determines, based on a speech recognition model, recognition results on the received voice input;
   acquiring, from the server, a list of the recognition results;
   in response to the list of the recognition results being acquired, hiding the animation and replacing the animation with a display of the list of the recognition results;
   providing an interface to revise a recognition result in the list of the acquired recognition results, the providing the interface comprising:
   in response to the user single clicking, double clicking, or hovering over an editing mode logo for the recognition result, sliding, for a duration distinct from the continuous refresh rate of the animation, the interface from a bottom of a screen of a display device in an accelerating and subsequently decelerating manner; and in response to revising the recognition result, feeding the revised recognition result to the server to train the speech recognition model.

2. The information input method according to claim 1, wherein the providing the interface to revise the recognition result further comprises:
   entering, in response to the interface being slid from the bottom of the screen of the display device, a text editing mode.

3. The information input method according to claim 2, wherein the providing the interface to revise the recognition result further comprises:
   presenting, in an associated manner, an editing mode logo for the recognition result; and
   entering, in response to a trigger of the editing mode logo by the user, the text editing mode.

4. The information input method according to claim 1, further comprising:
   determining a recognition result selected by the user from the list of the recognition results as an acquired recognition result,
   wherein the providing the interface to revise the acquired recognition result further comprises:
     enabling the user to edit any recognition result in the list of recognition results in a text format in response to the user not selecting any recognition result in the list of recognition results.

5. The information input method according to claim 1, further comprising, in response to providing the interface to revise the recognition result, accepting a revision by the user without prompting the user for another voice input.

6. The information input method according to claim 3, wherein, the presenting an editing mode logo for the recognition result comprises presenting the editing mode logo in response to a posture action by the user.

7. The information input method according to claim 1, further comprising:
   in response to revising the recognition result:
     initiating, by the remote server, a search using the revised recognition result;
     creating a window to present results of the search.

8. The information input method according to claim 1, wherein the animation comprises a microphone logo implemented by a function comprising a plot of three parameterized lines.

9. An information input device, comprising:
   one or more processors; and
   a memory storing instructions that, when executed by the one or more processors, cause the device to perform:
     receiving a voice input of a user;
     sending the received voice input to a server;
     displaying an animation having a continuous refresh rate while a server determines, based on a speech recognition model, recognition results on the received voice input;
     acquiring, from the server, a list of the recognition results;
     in response to the list of the recognition results being acquired, hiding the animation and replacing the animation with a display of the list of the recognition results;
     providing an interface to revise a recognition result in the list of the acquired recognition results, the providing the interface comprising:
       in response to the user single clicking, double clicking, or hovering over an editing mode logo for the recognition result, sliding, for a duration distinct from the continuous refresh rate of the animation, the interface from a bottom of a screen of a display device, in an accelerating and subsequently decelerating manner; and
     in response to revising the recognition result, feeding the revised recognition result to the server to train the speech recognition model.

10. The information input device according to claim 9, wherein the providing the interface to revise the recognition result further comprises:
    entering, in response to the interface being slid from the bottom of the screen of the display device, a text editing mode.

11. The information input device according to claim 10, wherein the providing the interface to revise the recognition result further comprises:
    presenting, in an associated manner, an editing mode logo for the recognition result; and
    entering, in response to a trigger of the editing mode logo by the user, the text editing mode.

12. The information input device according to claim 9, wherein the instructions further cause the device to perform:
    determining a recognition result selected by the user from the list of the recognition results as an acquired recognition result,
    and wherein the providing the interface to revise the recognition result further comprises:
    enabling the user to edit any recognition result in the list of recognition results in a text format in response to the user not selecting any recognition result in the list of recognition results.

13. A computing apparatus, comprising:
    a network interface, configured to enable the computing apparatus to conduct data communications with a server via one or more networks;
    a memory configured to store data communicated via the network interface; and
    one or more processors in connection with the network interface and the memory, the one or more processors being configured to execute the following operations:
      receiving a voice input of a user;
      sending the received voice input to a server;
      displaying an animation having a continuous refresh rate while a server determines, based on a speech recognition model, recognition results on the received voice input;
      acquiring, from the server, a list of the recognition results;
      in response to the list of the recognition results being acquired, hiding the animation and replacing the animation with a display of the list of the recognition results;
      providing an interface to revise a recognition result in the list of the recognition results, the providing the interface comprising:
        in response to the user single clicking, double clicking, or hovering over an editing mode logo for the recognition result, sliding, for a duration distinct from the continuous refresh rate of the animation, the interface from a bottom of a screen of a display device in an accelerating and subsequently decelerating manner; and
      in response to revising the recognition result, feeding the revised recognition result to the server to train the speech recognition model.

14. The computing apparatus according to claim 13, wherein the operation of providing the interface to revise the recognition result further comprises:
  entering, in response to the interface being slid from the bottom of the screen of the display device, a text editing mode.

15. The computing apparatus according to claim 14, wherein the providing the interface to revise the recognition result further comprises:
  presenting, in an associated manner, an editing mode logo for the recognition result; and
  entering, in response to a trigger of the editing mode logo by the user, the text editing mode to revise the recognition result.

16. The computing apparatus according to claim 13, wherein the operations further comprise:
  determining a recognition result selected by the user from the list of the recognition results as an recognition result,
  wherein the providing the interface to revise the recognition result comprises:
    enabling the user to edit any recognition result in the list of recognition results in a text format in response to the user not selecting any recognition result in the list of recognition results.

* * * * *